US011368677B2

(12) United States Patent
Rath et al.

(10) Patent No.: US 11,368,677 B2
(45) Date of Patent: Jun. 21, 2022

(54) BOUNDARY FILTERING FOR PLANAR AND DC MODES IN INTRA PREDICTION

(71) Applicant: InterDigital VC Holdings, Inc., Wilmington, DE (US)

(72) Inventors: Gagan Bihari Rath, Cesson-Sevigne (FR); Fabien Racape, Palo Alto, CA (US); Fabrice Urban, Cesson-Sevigne (FR)

(73) Assignee: InterDigital VC Holdings, Inc., Wilmington, DE (US)

(*) Notice: Subject to any disclaimer, the term of this patent is extended or adjusted under 35 U.S.C. 154(b) by 0 days.

(21) Appl. No.: 17/047,049

(22) PCT Filed: Apr. 29, 2019

(86) PCT No.: PCT/US2019/029724
§ 371 (c)(1),
(2) Date: Oct. 12, 2020

(87) PCT Pub. No.: WO2019/245650
PCT Pub. Date: Dec. 26, 2019

(65) Prior Publication Data
US 2021/0195171 A1 Jun. 24, 2021

(30) Foreign Application Priority Data

Jun. 18, 2018 (EP) .................................... 18305746
Aug. 13, 2018 (EP) .................................... 18306108

(51) Int. Cl.
H04N 19/105 (2014.01)
H04N 19/117 (2014.01)
(Continued)

(52) U.S. Cl.
CPC ......... *H04N 19/105* (2014.11); *H04N 19/117* (2014.11); *H04N 19/176* (2014.11); *H04N 19/593* (2014.11)

(58) Field of Classification Search
None
See application file for complete search history.

(56) References Cited

U.S. PATENT DOCUMENTS 9,282,344 B2 * 3/2016 Van der Auwera .... H04N 19/82
10,499,053 B2 * 12/2019 Chen .................... H04N 19/593
(Continued)

OTHER PUBLICATIONS

Zhao et al., "EE1 related: Simplification and extension of PDPC", Document: JVET-H0057, Joint Video Exploration Team (JVET) of ITU-T SG 16 WP 3 and ISO/IEC JTC 1/SC 29/WG 11, 8th Meeting: Macao, CN, pp. 1-3, Oct. 18-24, 2017.
(Continued)

Primary Examiner — Chikaodili E Anyikire
(74) Attorney, Agent, or Firm — Xiaoan Lu

(57) ABSTRACT

When a block is intra predicted, the predicted samples on the boundary are subject to boundary filtering for certain modes. Various embodiments are proposed to perform boundary filtering for intra prediction in the DC or PLANAR mode, using a gradient based approach. The gradient for a particular reference sample is calculated based on a difference between the particular reference sample and a predictor for predicting the particular reference sample. For the PLANAR mode, the difference between a top (left) reference sample and a linear interpolation using the top (left) reference samples is used as the gradient, a fractional part of which is propagated to the initial predicted samples with a decay function. For the DC mode, the difference between a top (left) reference sample and an average of reference samples is used as the gradient. The average can be computed with the top reference samples and/or left reference samples.

19 Claims, 5 Drawing Sheets

(51) Int. Cl.
*H04N 19/176* (2014.01)
*H04N 19/593* (2014.01)

(56) References Cited

U.S. PATENT DOCUMENTS

| 2013/0114708 | A1* | 5/2013 | Van der Auwera | H04N 19/593 |
| | | | | 375/240.12 |
| 2017/0310959 | A1* | 10/2017 | Chen | H04N 19/11 |
| 2020/0275124 | A1* | 8/2020 | Ko | H04N 19/11 |

OTHER PUBLICATIONS

Bordes et al., "Description of SDR, HDR and 360 video coding technology proposal by Qualcomm", Document: JVET-J002r1, Joint Video Experts Team (JVET) or ITU-T SG 16 WP 3 and ISO/IEC JTC 1/SC 29/WG 11, 10 Meeting: San Diego, US, pp. 1-84, Apr. 10-20, 2018.

Said et al.,"Position dependent intra prediction combination", ISO/IEC JTC1/SC29/WG11 MPEG2015/MPEG2015/MP37502, Geneva, CH, pp. 1-4, Oct. 2015.

Auwera et al., "Extension of Simplified PDPC to Diagonal Intra Modes", Document: JVET-J0069_r1, Joint Video Experts Team (JVET) of ITU-T SG 16 WP 3 and ISO/IEC JTC 1/SC 29/WG 11, pp. 1-4, 10th Meeting: San Diego, USA, Apr. 10-20, 2018.

Bross et al., "Study Text of 1S0/IEC DIS 23008-2 High Efficiency Video Coding", ISO/IEC JTC1/SC29/WG11 MPEG2012/N13155, Shanghai, China, pp. 1-164, Oct. 2012.

Panusopone et al., "Unequal Weight Planar Prediction and Constrained PDPC", Document: JVET-E0068-r1, Joint Video Exploration Team (JVET) of ITU-T SG 16 WP 3 and ISO/IEC JTC 1/SC 29/WG 11, 5th Meeting: Gevena, CH, pp. 1-6, Jan. 12-20, 2017.

Kim et al., "High Efficiency Video Coding (HEVC) Test Model 14 (HM14) Encoder Description", ISO/IEC JTC1/SC29/WG11, N14231,San Jose, USA, pp. 1-38, Jan. 2014.

Rath et al., "CE3-related: Gradient-Based Boundary Filtering in Intra Prediction", Document: JVET-K0172_r1, Joint Video Experts Team (JVET) of ITU-T SG 16 WP 3 and ISO/IEC JTC 1/SC 29/WG 11, pp. 1-9, 11 Meeting: Ljubjana, SI, Jul. 10-18, 2018.

Chen et al., "Further Improvements to HMKTA-1.0", ITU—Telecommunication Standardization Sector, Study Group 16, Question 6, Video Coding Experts Group (VCEG), Document VCEG-AZ07 v2, 52nd Meeting, pp. 1-8, Warsaw, Poland, Jun. 19, 2015.

Guo et al., "CE6 Subset d: Direction based Angular Intra Predication", Document: JCTVC-G279, Joint Collaborative Team on Video Coding (JCT-VC) of ITU-T SC16 WP3 and ISO/IEC JTC1/SC29/WG11, pp. 1-9, 7th Meeting: Geneva, CH, Nov. 21-30, 2011.

Anonymous, "Study Text of ISO/IEC DIS 23008-2 High Efficiency Video Coding", 102, MPEG Meeting;Oct. 15, 2012-Oct. 19, 2012; Shanghai; (Motion Picture Expert Group or ISO/IEC JTC1/SC29/WG11), No. N13155, pp. 141-292, Dec. 25, 2012.

* cited by examiner

BOUNDARY FILTERING FOR PLANAR AND DC MODES IN INTRA PREDICTION

This application claims the benefit, under 35 U.S.C. § 371 of International Application No. PCT/US2019/029724, filed Apr. 29, 2019, which was published on Dec. 26, 2019, which claims the benefit of European Patent Application Nos. EP18305746.2 filed Jun. 18, 2018 and EP18306108.4 filed Aug. 13, 2018.

TECHNICAL FIELD

The present embodiments generally relate to a method and an apparatus for video encoding or decoding, and more particularly, to a method and an apparatus for intra prediction in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method for video decoding is presented, comprising: forming an initial predictor for a sample in a block to be decoded, using a plurality of neighboring reference samples, wherein said plurality of neighboring reference samples include a first reference sample from an adjacent above block and a second reference sample from an adjacent left block; obtaining a first predictor for said first reference sample and obtaining a second predictor for said second reference sample; adjusting said initial predictor for said sample, based on (1) a first difference between said first reference sample and said first predictor and (2) a second difference between said second reference sample and said second predictor, to form a predictor for said sample; and reconstructing said sample responsive to said formed predictor.

According to another embodiment, a method for video encoding is presented, comprising: forming an initial predictor for a sample in a block to be encoded, using a plurality of neighboring reference samples, wherein said plurality of neighboring reference samples include a first reference sample from an adjacent above block and a second reference sample from an adjacent left block; obtaining a first predictor for said first reference sample and obtaining a second predictor for said second reference sample; adjusting said initial predictor for said sample, based on (1) a first difference between said first reference sample and said first predictor and (2) a second difference between said second reference sample and said second predictor, to form a predictor for said sample; and encoding said block responsive to said formed predictor.

According to another embodiment, an apparatus for video decoding is presented, comprising one or more processors, wherein said one or more processors are configured to: form an initial predictor for a sample in a block to be decoded, using a plurality of neighboring reference samples, wherein said plurality of neighboring reference samples include a first reference sample from an adjacent above block and a second reference sample from an adjacent left block; obtain a first predictor for said first reference sample and obtain a second predictor for said second reference sample; adjust said initial predictor for said sample, based on (1) a first difference between said first reference sample and said first predictor and (2) a second difference between said second reference sample and said second predictor, to form a predictor for said sample; and reconstruct said sample responsive to said formed predictor. The apparatus can further comprise one or more memories.

According to another embodiment, an apparatus for video encoding is presented, comprising one or more processors, wherein said one or more processors are configured to: form an initial predictor for a sample in a block to be encoded, using a plurality of neighboring reference samples, wherein said plurality of neighboring reference samples include a first reference sample from an adjacent above block and a second reference sample from an adjacent left block; obtain a first predictor for said first reference sample and obtaining a second predictor for said second reference sample; adjust said initial predictor for said sample, based on (1) a first difference between said first reference sample and said first predictor and (2) a second difference between said second reference sample and said second predictor, to form a predictor for said sample; and encode said block responsive to said formed predictor. The apparatus can further comprise one or more memories.

According to another embodiment, an apparatus for video decoding is presented, comprising: means for forming an initial predictor for a sample in a block to be decoded, using a plurality of neighboring reference samples, wherein said plurality of neighboring reference samples include a first reference sample from an adjacent above block and a second reference sample from an adjacent left block; means for obtaining a first predictor for said first reference sample and obtaining a second predictor for said second reference sample; means for adjusting said initial predictor for said sample, based on (1) a first difference between said first reference sample and said first predictor and (2) a second difference between said second reference sample and said second predictor, to form a predictor for said sample; and means for reconstructing said sample responsive to said formed predictor.

According to another embodiment, an apparatus for video encoding is presented, comprising: means for forming an initial predictor for a sample in a block to be encoded, using a plurality of neighboring reference samples, wherein said plurality of neighboring reference samples include a first reference sample from an adjacent above block and a second reference sample from an adjacent left block; means for obtaining a first predictor for said first reference sample and obtaining a second predictor for said second reference sample; means for adjusting said initial predictor for said sample, based on (1) a first difference between said first reference sample and said first predictor and (2) a second difference between said second reference sample and said second predictor, to form a predictor for said sample; and means for encoding said block responsive to said formed predictor.

According to another embodiment, a bitstream is generated by performing: forming an initial predictor for a sample in a block to be encoded, using a plurality of neighboring reference samples, wherein said plurality of neighboring reference samples include a first reference sample from an adjacent above block and a second reference sample from an adjacent left block; obtaining a first predictor for said first reference sample and obtaining a second predictor for said second reference sample; adjusting said initial predictor for said sample, based on (1) a first difference between said first reference sample and said first predictor and (2) a second difference between said second reference sample and said second predictor, to form a predictor for said sample; and encoding said block responsive to said formed predictor.

DETAILED DESCRIPTION

Figure 1:
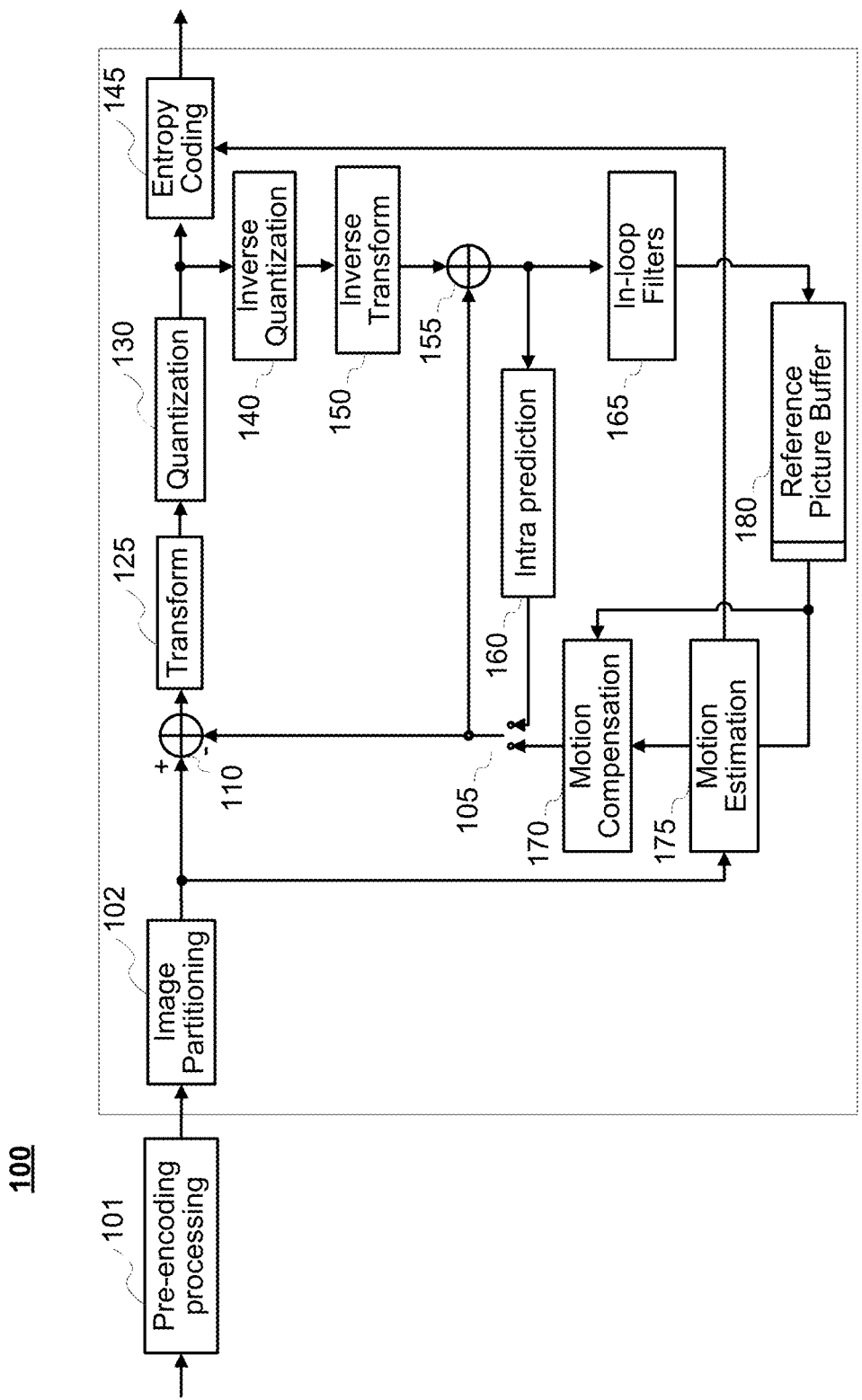
FIG. 1 illustrates a block diagram of an embodiment of a video encoder.

FIG. 1 illustrates a block diagram of a video encoder 100. FIG. 1 may illustrate a High Efficiency Video Coding (HEVC) encoder, a JEM (Joint Exploration Model) encoder under development by JVET (Joint Video Exploration Team), or an encoder employing technologies similar to those used in HEVC or JEM.

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (102). In the present application, the term "block" can be used to refer, for example, to any of CTU (Coding Tree Unit), CU (Coding Unit), PU (Prediction Unit), TU (Transform Unit), CB (Coding Block), PB (Prediction Block), and TB (Transform Block) as used in HEVC or JEM. In addition, the "block" can also be used to refer to a macroblock and a partition as specified in H.264/AVC or other video coding standards, and more generally to refer to an array of data of various sizes.

In the encoder 100, a picture is encoded by the encoder elements as described below. The picture to be encoded is processed in units of, for example, CUs. Each coding unit is encoded using either an intra or inter mode. When a coding unit is encoded in an intra mode, it performs intra prediction (160). In an inter mode, motion estimation (175) and compensation (170) are performed. The encoder decides (105) which one of the intra mode or inter mode to use for encoding the coding unit, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145), for example, using context-based adaptive binary arithmetic coding (CABAC), to output a bitstream.

The encoder may skip the transform and apply quantization directly to the non-transformed residual signal, for example, on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
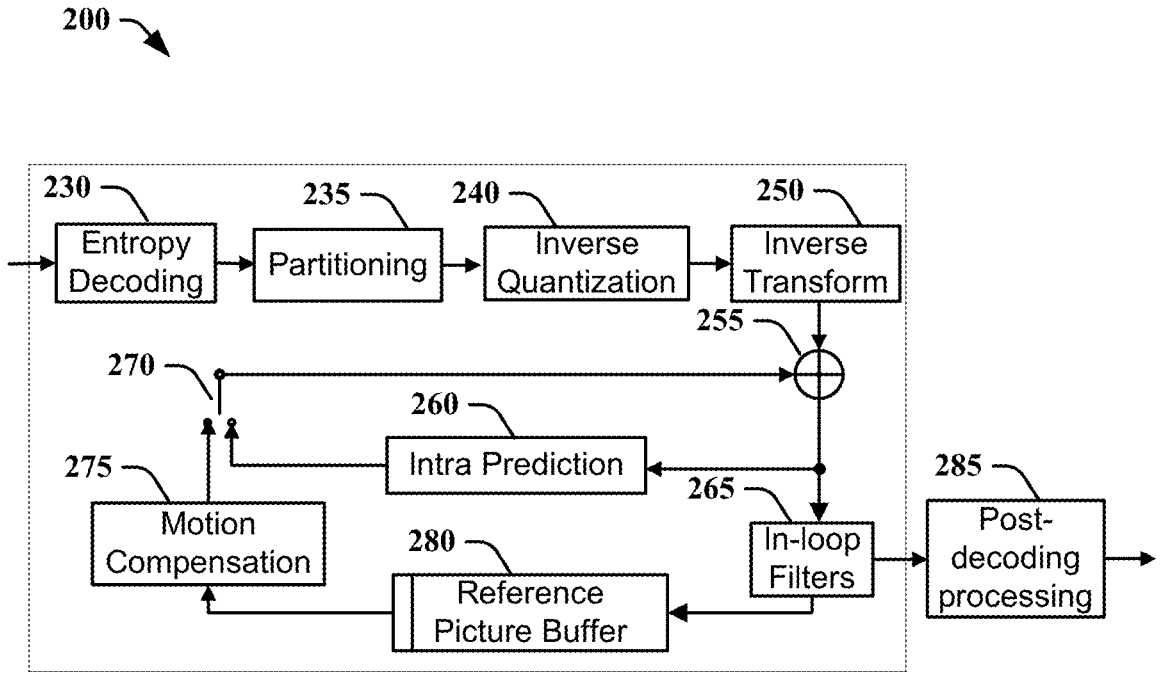
FIG. 2 illustrates a block diagram of an embodiment of a video decoder.

FIG. 2 illustrates a block diagram of a video decoder 200. FIG. 2 may illustrate an HEVC decoder, a JEM decoder, or a decoder employing technologies similar to HEVC or JEM. In the decoder 200, a bitstream is decoded by the decoder elements as described below. Video decoder 200 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (230) to obtain transform coefficients, motion vectors, picture partitioning information, and other coded information.

The picture partitioning information indicates how the picture is partitioned. The decoder may therefore divide (235) the picture according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101).

The post-decoding processing may use metadata derived in the pre-encoding processing and signaled in the bitstream.

Figure 3:
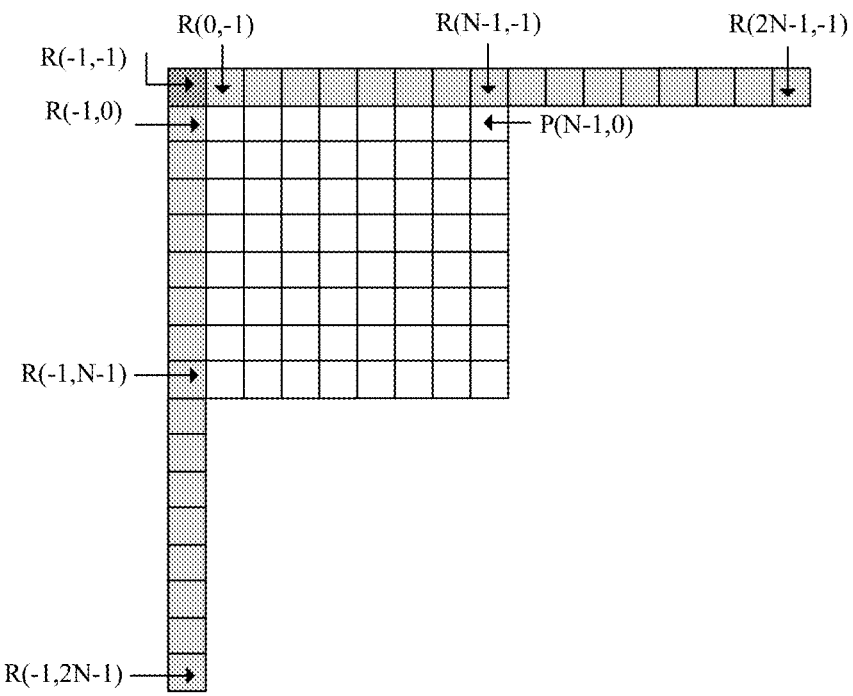
FIG. 3 is a pictorial example depicting reference samples for intra predicting a current block in HEVC.

As described above, a block may be intra predicted. In video coding standards such as HEVC, H.264/AVC, the intra prediction process generally includes three steps: (1) reference sample generation, (2) intra sample prediction and (3) post-processing of predicted samples. Samples from causal neighboring blocks (i.e., already encoded or decoded blocks) are used as reference samples. FIG. 3 illustrates an example of reference samples used in HEVC, where the pixel value at coordinate (x, y), with respect to the above-left corner of the current block, is indicated by P(x,y). For a CU of size N×N, a row of 2N reference samples on the top is formed from the decoded CUs. Similarly, a column of 2N reference samples on the left is formed from the decoded CUs. The corner pixel from the above-left decoded CU is used to fill up the gap between the above row and the left column of reference samples. If some of the reference samples are not available, for example, when the corresponding CUs are not in the same slice or the current CU is at a frame boundary, then reference sample substitution is performed, where the missing samples are copied from the available samples in a clock-wise direction. Then, depending on the current CU size and the prediction mode, the reference samples are filtered using a specified filter.

The next step, i.e., the intra sample prediction, consists of predicting the pixels of the target CU based on the reference samples. In order to predict different kinds of content efficiently, HEVC supports a range of prediction modes. In particular, planar and DC prediction modes are used to predict smooth and gradually changing regions, whereas directional prediction modes are used to capture different directional structures. HEVC supports 33 directional prediction modes which are indexed from 2 to 34. These prediction modes correspond to different prediction directions, wherein the numbers denote intra prediction mode indices.

In the Joint Exploration Model (JEM) code of JVET, the number of prediction modes has been increased to 67, which includes one PLANAR mode, one DC mode, and 65 angular modes, as described in "Further Improvements to HMKTA-1.0," J. Chen, W.-J. Chien, M. Karczewicz, X. Li, H. Liu, A. Said, L. Zhang, X. Zhao, VCEG-AZ07, Warsaw, Poland, June 2015. The higher number of prediction modes included have been proposed to exploit the possibility of such angular structures with bigger block sizes in JEM.

Some of the prediction modes such as the DC mode and directly horizontal and directly vertical modes may cause discontinuity at the CU boundaries of the prediction samples. Therefore, such prediction modes are followed by a post-processing or boundary-filtering step where the boundary of the predicted samples are smoothed using a low-pass filter. Here, directly horizontal mode refers to the prediction mode when the reference samples on the left side of a target block are repeated horizontally to the right for intra prediction. Similarly, directly vertical mode refers to the prediction mode when the reference samples on the top of a target block are repeated vertically down for intra prediction.

The aim of the boundary filtering is to reduce the discontinuity with the neighboring reference samples which indirectly reduces the blocking artifacts at the block boundaries, and also increases the coding efficiency. In HEVC, for the DC prediction mode, the first column and the first row of the predicted block are filtered after the prediction. In JEM, in addition to the boundary filtering in DC mode, it has been proposed to perform boundary filtering in the PLANAR prediction mode as well.

The present embodiments are directed to boundary filtering in intra prediction. In particular, we propose to apply a gradient based boundary filtering in DC and PLANAR prediction modes, in order to improve the existing techniques in terms of coding performance while keeping the complexity increase low.

In various embodiments, we propose new boundary filtering methods for PLANAR and DC intra prediction modes. We compute the gradients or residual differences at the reference samples and propagate a fractional part of the computed values to the adjacent rows and columns with decay functions. We aim to produce a gradual change in intensity values between the reference samples and the predicted sample values in the adjacent rows and columns.

As described above, PLANAR and DC prediction modes (indexed as mode 0 and mode 1, respectively) are used to predict smooth and gradually changing regions in a frame. In the DC mode, all target pixels are predicted with the DC value of the reference samples on top and left of the target block, whereas in the PLANAR mode, the predicted values are the average of two linear interpolations, one made with the top reference samples and the bottom-left reference sample (vertical interpolation), and another made with the left reference samples and the top-right reference sample (horizontal interpolation). The first interpolation aims to model a gradual change of intensity along the vertical direction whereas the second one aims to model the gradual change of intensity along the horizontal directions.

In either of the DC and PLANAR modes, there may be discontinuity at the boundary of the target block because of the mismatch between the value of the computed predicted values and the neighboring reference samples. The effect is more pronounced in DC mode if the reference samples on the top and left have large variance. In the PLANAR mode, the effect is less pronounced because the discontinuity is caused by only one of the interpolations. The vertical interpolation can cause discontinuity along the left boundary whereas the horizontal interpolation can cause the same along the top boundary. HEVC includes boundary-filtering for DC mode whereas, in JEM, boundary filtering methods have been proposed for the PLANAR mode in addition. In various embodiments, we aim to improve the boundary-filtering step for DC and PLANAR modes using a gradient based approach. In the following, the DC and PLANAR modes in HEVC and JEM are described in detail, then various embodiments on boundary filtering are provided.

DC Prediction in HEVC

For a given target block to be intra predicted, the encoder or decoder first constructs two reference arrays (one on top and one on the left) as shown in FIG. 3. The reference samples are taken from the decoded samples in top, top-right, left, left bottom and top-left decoded blocks, and may have been filtered depending on the block size and prediction mode. In FIG. 3, the predicted pixel values at co-ordinates (x,y) are indicated by P(x,y), and reference pixel values are indicated by R(x,y). Both reference arrays have 2N+1 reference samples.

In DC prediction mode, all the target pixels are predicted using a single value computed as:

$$P(x, y) = dcVal = \frac{\sum_{x=0}^{N-1} R(x, -1) + \sum_{y=0}^{N-1} R(-1, y)}{2N} \text{ for } 0 \leq x, y < N - 1 \quad (1)$$

where R (x, −1) denotes the reference sample at (x, −1) on the top reference array, R (−1, y) denotes the reference sample at (−1, y) on the left reference array, and N is the target block's width or height (in HEVC, all blocks have square shape). Then both the top and the left boundaries of the target block are filtered. The predicted sample at co-ordinate (0,0) of the target block is filtered using the 3-tap smoothing filter [1 2 1]/4 as:

$$P'(0,0)=(R(-1,0)+2*dcVal+R(0,-1)+2)>>2,$$

where P' denotes the filtered value of a predicted sample, and R (1,0) and R(0, 1) denote the reference samples at coordinates (−1, 0) and (0, −1) respectively.

The remaining predicted samples at the top boundary and at the left boundary are filtered using the 2-tap filter [3, 1]/4 as:

$$P'(x,0)=(3*dcVal+R(x,-1)+2)>>2, 1\leq x<N \text{(top boundary)}$$

$$P'(0,y)=(3*dcVal+R(-1,y)+2)>>2, 1\leq y<N \text{(left boundary)}$$

To keep the complexity low, the above boundary filtering is applied to only Luma blocks of size 16×16 or smaller.

PLANAR Prediction in HEVC

In the PLANAR mode, the prediction at a target pixel is obtained from two interpolations as:

$$P(x,y)=(P_v(x,y)+P_h(x,y)+N)>>(\log 2(N)+1), 0\leq x,y<N, \quad (2)$$

where $P_v(x, y)$ and $P_h(x, y)$ are the vertical and horizontal interpolations obtained as $$P_v(x,y)=(N-1-y)*R(x,-1)+(1+y)*R(-1,N), 0\leq x,y<N; \quad (3)$$

$$P_h(x,y)=(N-1-x)*R(-1,y)+(1+x)*R(N,-1), 0\leq x,y<N. \quad (4)$$

Figure 4:
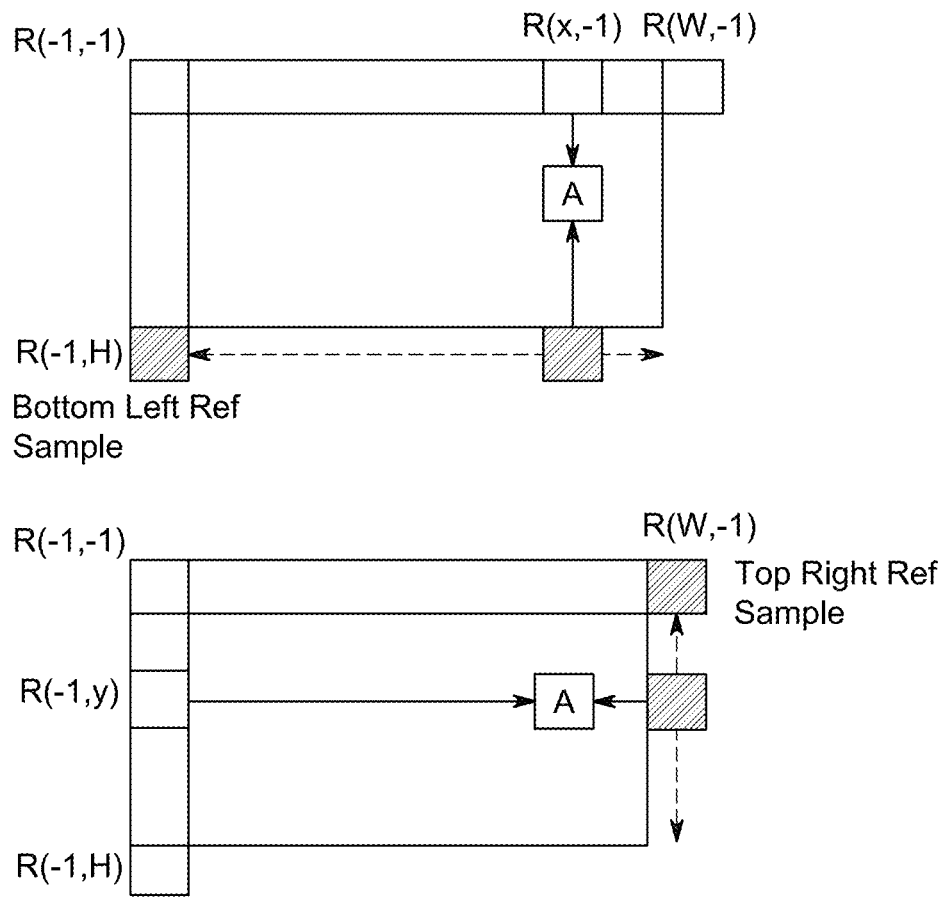
FIG. 4 is a pictorial example depicting intra prediction in a planar mode.

For the target pixel at coordinate (x, y), R (x, −1) is the top reference sample, R (−1, y) is the left reference sample, R (−1, N) is the bottom left reference sample, and R(N, −1) is the top right reference sample. This is shown in FIG. 4 in the context of JEM. Therefore, the vertical interpolation is a linear interpolation between the reference samples on immediate top and the bottom-left reference sample and the horizontal interpolation is a linear interpolation between the reference samples on immediate left and the top-right reference sample. We see that the scaling required in the interpolation has been combined with the averaging of the interpolations in Eq. (2).

PLANAR and DC Prediction in JEM

In JEM, because of quadtree-binary tree structure (QTBT), the reference arrays each have (1+W+H) samples, where W and H denote the width and height of the target block, respectively. In JEM, the predictions in DC and PLANAR modes remain essentially the same as in HEVC except the changes required in the equations above to take into account unequal height and width. In addition, proposals have been made to improve both DC and PLANAR predictions that aim at reducing the discontinuities at the boundaries.

An article, entitled "Unequal weight planar prediction and constrained PDPC," by K. Panusopone, S. Hong, and L. Wang, JVET-E0068, Geneva, January 2017 (hereinafter "JVET-E0068"), proposed a variation of PLANAR prediction, called unequal weight planar (UWP) prediction. In order to form the vertical and horizontal interpolations, they first estimate the value of the target pixel at (W, H), P(W, H), as a weighted sum of the bottom-left and top-right reference samples:

$$P(W, H) = \frac{(H \times R(W, -1) + W \times R(-1, H))}{(H + W)}$$

Then they estimate the predictions for the pixels on the immediate bottom and right of the target block by linearly interpolating between this estimate, and the bottom-left and top-right reference samples:

$$P_b(x, H) = \frac{((W - 1 - x) \times R(-1, H) + (x + 1) \times P(W, H))}{W},$$

$$P_r(W, y) = \frac{((H - 1 - y) \times R(W, -1) + (y + 1) \times P(W, H))}{H}.$$

Now the horizontal interpolation is done between the left reference samples and the estimated samples on the immediate right. Similarly, the vertical interpolation is done between the top reference samples and the estimated samples on the immediate bottom:

$$P_h(x,y)=(W-1-x)\times R(-1,y)+(x+1)\times P_r(W,y),$$

$$P_v(x,y)=(H-1-y)\times R(x,-1)+(y+1)\times P_b(x,H).$$

Since the horizontal interpolation has more accurate prediction closer to the left reference and the vertical interpolation has more accurate prediction closer to the top reference, they take a weighted average of the two interpolations to obtain the final prediction:

$$P(x, y) = \frac{(H \times P_h(x, y) \times (y + 1) + W \times P_v(x, y) \times (x + 1))}{(H \times W \times (x + y + 2))}.$$

The first part of the algorithm aims to improve the vertical and horizontal interpolations whereas the last part takes care of the boundary smoothing by giving higher weight to the more accurate interpolation closer to the boundaries. Since the computation involves a division operation, they provide an alternative computation with shift operators and tabulated values aiming to achieve approximate prediction values.

An article, entitled "Simplification and extension of PDPC," by X. Zhao, V. Seregin, A. Said, and M. Karczewicz, JVET-H0057, Macao, October 2017 (hereinafter "JVET-H0057"), proposed a different method that uses the concept of PDPC. Unlike JVET-E0068, where the prediction is made in one pass, they propose a two-pass method, where the first pass obtains an initial intra predictor using the normal prediction method, and the second pass updates the first-pass estimates using the reference samples on the top, left and top left of the target block:

$$P'(x,y)=(wL*R(-1,y)+wT*R(x,-1)+wTL*R(-1,1)+(64-wL-wT-wTL)*P(x,y)+32)>>6,$$

where wL, wT, and wTL are weights corresponding to the reference samples on the left, top, and top-left, computed as:

$$wT=32>>((y<<1)>>\text{shift}),$$

$$wL=32>>((x<<1)>>\text{shift}),$$

$$wTL=-((wL>>4)+(wT>>4)),$$

where shift=(log 2(W)+log 2(H)+2)>>2. Both the PLANAR and the DC prediction modes use this update method. As we see, since the weights decrease as a pixel moves away from the reference arrays, this method aims to smoothen the boundaries giving additional weights to the nearby reference samples.

Unlike the methods of JVET-E0068 and JVET-H0057, our method of smoothing the boundary is based on a gradient approach. We estimate the gradient at the reference sample positions by computing the differences between the reference samples and their predicted values. Using a suitable decay function, we add gradually decreasing portions of the gradient to the predicted values of the target pixels at the block boundary. Our method is also two-pass since we update the original predicted values from the first-pass, which are obtained using the normal prediction method, using the gradient.

Boundary Filtering for PLANAR Mode

For the sake of generality, we will assume a rectangular block with width W and height H. As we have seen before, the PLANAR mode prediction has two intermediate components: one horizontal interpolation and one vertical interpolation. The average of these two components produces the final prediction.

Since linear interpolation provides a gradual change of intensity values, the horizontal interpolation does not produce sharp changes at the left boundary of the target block, but may create discontinuity at the top boundary depending on the top-right reference sample $R(W, -1)$. In an analogous manner, the vertical interpolation does not produce sharp changes at the top boundary of the target block, but may create discontinuity at the left boundary depending on the bottom left reference sample $R(-1, H)$.

Consider the horizontal interpolation $P_h(x, y)$ in Eq. (4). For a rectangular block with width W and height H, it can be rewritten as:

$$P_h(x,y)=(W-1-x)*R(-1,y)+(1+x)*R(W,-1), 0 \leq x<W; 0 \leq y<H$$

Applying the same interpolation to the top reference samples, i.e. interpolating between the top-left and top-right reference samples, we get a predictor for predicting $R(x, -1)$ in the horizontal interpolation:

$$P_h(x,-1)=(W-1-x)*R(-1,-1)+(1+x)*R(W,-1), 0 \leq x<W \quad (P1)$$

Thus, the gradient at the top reference samples can be estimated as $$\Delta_v(x)=R(x,-1)-(P_h(x,-1)>>\log 2(W)), 0 \leq x<W \quad (P2)$$

We can then modify the horizontal interpolation as $$P'_h(x,y)=P_h(x,y)+W*\Delta_v(x)*L(y), 0 \leq x<W; 0 \leq y<H$$

where $L(y)$ is a decay function having values in the closed interval [0, 1]. For fixed-point implementation, we can use an alternative formulation as follows:

$$P'_h(x,y)=P_h(x,y)+(W*\Delta_v(x)*L(y)+32)>>6, 0 \leq x<W; 0 \leq y<H$$

where, $L(y)$ can have positive integral values in the range [0, 32], for example, $L(y)=(32>>((y<<1)>>\text{shift}))$, where $\text{shift}=(\log 2(W)-1+\log 2(H)-1)>>2$. Note that with this shift parameter value, the decay function now varies with the size of the target block.

Now, consider the vertical interpolation $P_v(x, y)$ in Eq. (3). For a rectangular block with width W and height H, it can be rewritten as:

$$P_v(x,y)=(H-1-y)*R(x,-1)+(1+y)*R(-1,H), 0 \leq x<W; 0 \leq y<H$$

Applying the same interpolation to the left reference samples, i.e. interpolating between the top left and bottom left reference samples, we get a predictor for predicting $R(-1, y)$ in the vertical interpolation:

$$P_v(-1,y)=(H-1-y)*R(-1,-1)+(1+y)*R(-1,H), 0 \leq y<H \quad (P3)$$

Thus, the gradient at the left reference samples can be estimated as $$\Delta_h(y)=R(-1,y)-(P_v(-1,y)>>\log 2(H)), 0 \leq y<H \quad (P4)$$

We can then modify the vertical interpolation as $$P'_v(x,y)=P_v(x,y)+H*\Delta_h(y)*L(x), 0 \leq x<W; 0 \leq y<H$$

where $L(x)$ is a decay function having values in the closed interval [0, 1]. We can use the same decay function as $L(y)$ without losing any generality since there is no directionality associated with planar prediction. Thus, we can use an alternative formulation as follows:

$$P'_v(x,y)=P_v(x,y)+(H*\Delta_h(y)*L(x)+32)>>6, 0 \leq x<W; 0 \leq y<H$$

where, $L(x)=(32>>((x<<1)>>\text{shift}))$, and $\text{shift}=(\log 2(W)-1+\log 2(H)-1)>>2$.

Now the final prediction can be obtained as in Eq. (2):

$$P'(x, y) = (W * P'_v(x, y) + H * P'_h(x, y) + W * H) >> (1 + \log2(W) + \log2(H))$$
$$= P(x, y) + ((\Delta_v(x)*L(y) + \Delta_h(y)*L(x) + 64) >> 7).$$

Since the update can take the values outside the dynamic range, we can use the above equation with clipping to the dynamic range:

$$P'(x,y)=\text{Clip}(P(x,y)+((\Delta_v(x)*L(y)+\Delta_h(y)*L(x)+64)>>7)) \quad (P5)$$

Thus, the algorithm can be summarized as:
(i) Compute $P(x, y)$ as in existing planar method.
(ii) Compute $P_h(x, -1)$, and then $\Delta_v(x)$, for $0 \leq x<W$ as in Eq. (P1) and Eq. (P2).
(iii) Compute $P_v(-1, y)$, and then $\Delta_h(y)$, for $0 \leq y<H$ as in Eq. (P3) and Eq. (P4).
(iv) Update $P(x, y)$ as in Eq. (P5) to get $P'(x, y)$.

Note that, if computing $P_h(x, -1)$ and $P_v(-1,y)$ will be issues due to complexity reasons, we can simply use the first prediction row, $P_h(x, 0)$, instead of $P_h(x, -1)$, as the predictor for $R(x, -1)$ in the horizontal interpolation and the first prediction column, $P_v(0, y)$ instead of $P_v(-1, y)$, as the predictor for $R(-1, y)$ in the vertical interpolation. Or, we can use an alternative formulation for the boundary filtering using the first column and the first row of the first pass prediction $P(x, y)$, as presented below.

An alternative formulation to perform similar boundary filtering is to directly use the first pass prediction. In this case, we will compute the horizontal and vertical gradients as:

$$\Delta_v(x)=R(x,-1)-P(x,0), 0 \leq x<W$$

$$\Delta_h(y)=R(-1,y)P(0,y), 0 \leq y<H$$

Additionally, we will also compute the gradient at the top left pixel as:

$$\Delta_d=R(-1,-1)P(0,0).$$

Using these values, the first pass prediction will be filtered as:

$$P'(x,y)=\text{Clip}(P(x,y)+((\Delta_v(x)*L(y)+\Delta_h(y)*L(x)-\Delta_d*L+32)>>6)) \quad (P6)$$

where $L=\min(L(x), L(y))$.

In the above, we use the PLANAR mode in JEM6.0 to illustrate the proposed boundary filtering methods in intra prediction. It should be noted that the methods can also be applied to other kinds of PLANAR modes as long as the PLANAR mode prediction is constructed using a vertical part and a horizontal part where the two parts are relatively smooth at their respective reference samples. In Unequal Weight Planar (UWP), for example, the proposed filtering can be applied to the intermediate interpolations. If the PLANAR prediction will be constructed directly without the intermediate interpolations, the alternative formulation mentioned above can be used.

Boundary Filtering for DC Mode

In HEVC and JEM, the DC value is computed in the first-pass prediction taking the reference samples on the top and the left of the target block. Then in the second pass, the first row and the first column predictions are filtered, as described before.

Here we propose to split the computation of the DC value in two steps. First, we compute a horizontal DC taking only the reference samples on the immediate left. Then we compute a vertical DC taking only the reference samples on the immediate top. The order of computation is unimportant. The final DC value is computed taking the average of the horizontal and vertical DC values. This way of computation will avoid the division operation required in JEM when the sum of width and height of the target block is not a power of 2, however the resulting prediction may be less accurate than the original DC value in some cases. Since we will filter the boundary samples after the first-pass prediction, the prediction inaccuracy can be ignored.

We compute the horizontal DC and vertical DC as:

$$DC_h = \frac{\sum_{y=0}^{H-1} R(-1, y)}{H}, DC_v = \frac{\sum_{x=0}^{W-1} R(x, -1)}{W}.$$

Then the target block is initially predicted as:

$$P(x, y) = dcVal = \frac{DC_h + DC_v}{2} \text{ for } 0 \leq x < W; 0 \leq y < H. \quad (D1)$$

We compute the vertical gradient on immediate top as:

$$\Delta_v(x) = R(x,-1) - dcVal, 0 \leq x < W \quad (D2)$$

Similarly, we compute the horizontal gradient on immediate left as:

$$\Delta_h(y) = R(-1,y) - dcVal, 0 \leq y < H \quad (D3)$$

We compute the gradient at the top left corner as:

$$\Delta_d = ((R(-1,0) + R(0,-1)) >> 1) - dcVal. \quad (D4)$$

The predicted pixel values are then filtered as:

$$P'(x,y) = \text{Clip}(dcVal + ((\Delta_v(x)*L(y) + \Delta_h(y)*L(x) - \Delta_d*L + 32) >> 6)) \quad (D5)$$

where L(x) and L(y) are as given in before for PLANAR boundary filtering, and L=min(L(x), L(y)).

Notice that the original DC value, as calculated in JEM, can be computed as a weighted sum of $DC_h$ and $DC_v$, where the weights are the height H and width W:

$$dcVal_{orig} = \frac{H*DC_h + W*DC_v}{H+W}$$

Hence, if the filtering is applied only on small block sizes for LUMA component only, as done in HEVC and JEM, we can use $dcVal_{orig}$ as the predicted value in the DC mode for the remaining blocks.

An alternative formulation to perform similar boundary filtering can be derived as in the case of PLANAR boundary filtering. The horizontal DC, if used as the DC prediction, will be more likely close to the reference samples on the left (provided their variance is small); however, it may create discontinuity at the top border. Similarly, the vertical DC, if used as the DC prediction, will be more likely close to the reference samples on the top (provided their variance is small); however, it may create discontinuity at the left border. Therefore, we can apply top boundary filtering taking $DC_h$ as a prediction, and left boundary filtering taking $DC_v$ as a prediction, and then finally take an average of the both.

$$P'_h(x, y) = DC_h + (\Delta_v(x)*L(y) + 32) >> 6, 0 \leq x < W; 0 \leq y < H$$

where $$\Delta_v(x) = R(x, -1) - DC_h, 0 \leq x < W.$$

$$P'_v(x, y) = DC_v + (\Delta_h(y)*L(x) + 32) >> 6, 0 \leq x < W; 0 \leq y < H$$

where $$\Delta_h(y) = R(-1, y) - DC_v, 0 \leq y < H.$$

$$P'(x, y) = \frac{P'_h(x, y) + P'_v(x, y)}{2}, 0 \leq x < W; 0 \leq y < H,$$

$$= dcVal + ((\Delta_v(x)*L(y) + \Delta_h(y)*L(x) + 64) >> 7)$$

where dcVal is given in Eq. (D1). As before, we can use clipping to make sure that the filtered values are still within the valid dynamic range:

$$P'(x,y) = \text{Clip}(dcVal + ((\Delta_v(x)*L(y) + \Delta_h(y)*L(x) + 64) >> 7)), 0 \leq x < W; 0 \leq y < H.$$

If the variances of the reference samples are not small, the two DC values, while having the possibility of creating discontinuities at the opposite boundaries, will also create some discontinuity at the boundary where they are computed. Hence this alternative formulation is expected to be less efficient compared to the earlier one.

Figure 5:
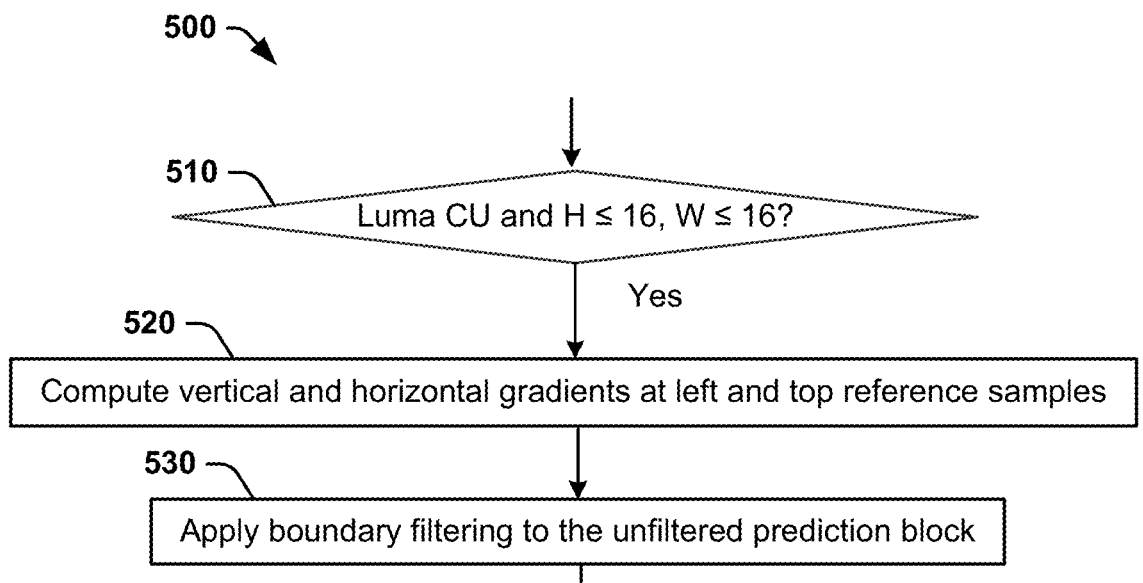
FIG. 5 illustrates a method of selectively applying boundary filtering in intra prediction, according to an embodiment.

FIG. 5 illustrates method 500 for boundary filtering in intra prediction, according to an embodiment. In method 500, we assume the JEM codec, which is based on the HEVC codec, is used. The same boundary filtering method should be used for intra prediction at the encoder and decoder, in order for a bitstream to be decoded properly by the decoder.

In this embodiment, after a block is intra predicted using either the DC or PLANAR mode, the predicted samples are boundary filtered as described before. This is done both at the encoder and the decoder. A simple variation of this embodiment will apply the proposed filtering only to Luma blocks excluding the Chroma blocks. Another variation can consider only blocks of small size, for example, blocks with height and width less than or equal to 16 as shown in FIG. 5.

Referring to FIG. 5, at step 510, for INTRA DC or PLANAR mode, the encoder or decoder checks whether a block is a LUMA CU and the width and height of the block is no greater than 16. If these conditions are satisfied, the encoder or decoder computes (520) the vertical and horizontal gradients at the left and top reference samples, respectively, for example, using the method as described above. Then the prediction block from the initial prediction (i.e., first pass) is adjusted (530) using boundary filtering. The filtered prediction block may then be used to get the prediction residuals at the encoder side, or to be added to the prediction residuals to reconstruct the block at the decoder side.

In another embodiment, after a block is initially intra predicted in the DC or PLANAR mode, the decision to use boundary filtering is made using a gradient threshold. Then the block will undergo boundary filtering if the gradient threshold condition is satisfied. Looking at Eq. (P5), we see that, if values of $\Delta_v(x)$ and $\Delta_h(y)$ are zero, the update term is zero for any decay function. As a result, it is useless to perform the update. This motivates us to apply a reasonable threshold for the gradient value before making the filtering decision. Since the gradient value can change over the boundary of the target block, we will consider the average absolute gradient, which can be computed as:

$$|\Delta|_h = \frac{\left(\sum_{y=0}^{H-1} |\Delta_h(y)| + (H >> 1)\right)}{H},$$

$$|\Delta|_v = \frac{\left(\sum_{x=0}^{W-1} |\Delta_v(x)| + (W >> 1)\right)}{W}, |\Delta| = \frac{|\Delta|_h + |\Delta|_v}{2}$$

If $|\Delta|$ is greater than a preset threshold value, then we use gradient filtering, otherwise the filtering is skipped. The threshold value can be decided based on the bit-depth and/or block size. In the case when the top or left decoded blocks are not available, we will use either $|\Delta|_h$ or $|\Delta|_v$ depending on if the left or top blocks are available. When neither the top nor the left blocks are available, we will not perform any boundary filtering.

In another embodiment, we can use several decay functions. The decay function giving the best RD performance is signaled to the decoder using additional bits. If we use two decay functions, for example, we signal the better one using one bit, which is context encoded. If we use three decay functions, we use the signaling bit combinations as 0, 10, and 11 in order to indicate the best decay function. This signaling can be made at the block level, at the slice level, or at the frame level.

In another embodiment, we use the boundary filtering in DC and PLANAR intra prediction in a slice, a frame, or any frame of a video sequence, and signal the application of boundary filtering to the decoder using a one-bit flag in the slice header, Picture Parameter Set (PPS) header, or Sequence Parameter Set (SPS) header.

We performed experiments with the JVET BMS (Benchmark Set) code in All-INTRA (AI) configuration with only one frame from JVET test sequences. We used the dyadic decay function which is given before. In the DC prediction mode, we apply the proposed boundary filtering to only Luma blocks having width and height smaller than or equal to 16. In the PLANAR prediction mode, we apply the proposed boundary filtering to both Luma and Chroma blocks of all valid sizes. Table 1 and Table 2 show the BD-rate performance of the proposed boundary filtering in DC and PLANAR modes over the JVET Benchmark code (BMS 1.0). We note that there is a BD-rate reduction of about 0.15% and 0.51% with very little computation complexity change.

TABLE 1

BD-rate performance of proposed boundary filtering in DC mode over BMS 1.0.

| | Over Over BMS 1.0 | | | | |
|---|---|---|---|---|---|
| | Y | U | V | EncT | DecT |
| UHD1 | −0.14% | −0.50% | −0.34% | 102% | 99% |
| HD1 | −0.16% | −0.73% | −0.28% | 100% | 98% |
| Class C | −0.22% | −0.73% | −1.47% | 101% | 97% |
| Class D | −0.19% | −0.64% | −2.26% | 99% | 98% |
| Average 1 | −0.15% | −0.61% | −0.31% | 101% | 98% |

TABLE 2

BD-rate performance of proposed boundary filtering in PLANAR mode over BMS 1.0.

| | Over BMS 1.0 | | | | |
|---|---|---|---|---|---|
| | Y | U | V | EncT | DecT |
| UHD1 | −0.59% | −0.47% | −0.51% | 102% | 103% |
| HD1 | −0.43% | −0.92% | −0.73% | 98% | 98% |
| Class C | −0.42% | −0.69% | −1.06% | 97% | 96% |
| Class D | −0.32% | 0.32% | −0.21% | 97% | 94% |
| Average 1 | −0.51% | −0.69% | −0.62% | 100% | 101% |

The proposed boundary filtering in intra prediction aims to improve the continuity at the target block boundary in DC and PLANAR prediction modes. The proposed methods consider that the intra predictor in the DC or PLANAR mode come from a horizontal interpolation/average and a vertical interpolation/average. At first, an initial predictor is formed. Then the difference between a top reference sample and the horizontal interpolation/average is used to adjust the initial predictor along the vertical direction, and the difference between a left reference sample and the vertical interpolation/average is used to adjust the initial predictor along the horizontal direction.

The filtering process is quite simple as it uses the gradient at the boundary reference samples and uses a dyadic decay function that can be implemented with bit shifts. Therefore, the additional complexity requirement is very minimal. With this we expect to get higher BD-rate performance as well as better visual quality at the expense of a very small complexity increase in DC and PLANAR prediction modes.

Various methods according to the present embodiments as described above may be used to modify, e.g., the intra prediction module (160, 260) of the JVET or HEVC encoder 100 and decoder 200 as shown in FIG. 1 and FIG. 2 respectively. Moreover, the present embodiments are not limited to JVET or HEVC, and may be applied to other standards, recommendations, and extensions thereof.

Various methods are described herein, and each of the methods comprises one or more steps or actions for achieving the described method. Unless a specific order of steps or actions is required for proper operation of the method, the order and/or use of specific steps and/or actions may be modified or combined. Unless indicated otherwise, or technically precluded, the aspects described in this document can be used individually or in combination. Various numeric values are used in the present document, for example, the parameter used in bit shifting for integer implementation, the filtering parameters, and the number of reference samples used for intra prediction. The specific values are for example purposes and the aspects described are not limited to these specific values.

Figure 6:
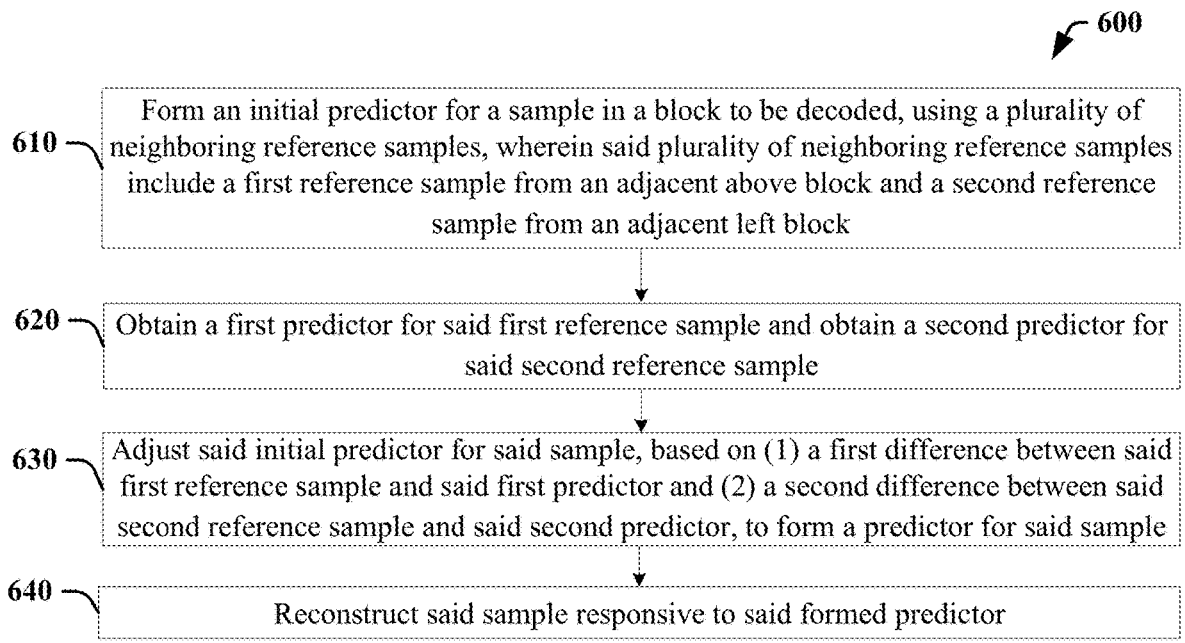
FIG. 6 illustrates a method of video encoding using boundary filtering in intra prediction, according to an embodiment.

FIG. 6 illustrates a method (600) of decoding video data, according to an embodiment. At step 610, for a sample in a block to be decoded, an initial predictor is formed, using a plurality of neighboring reference samples, wherein said plurality of neighboring reference samples include a first reference sample from an adjacent above block and a second reference sample from an adjacent left block. At step 620, a first predictor is obtained for said first reference sample and a second predictor is obtained for said second reference sample. At step 630, said initial predictor for said sample is adjusted, based on (1) a first difference between said first reference sample and said first predictor and (2) a second difference between said second reference sample and said second predictor, to form a predictor for said sample. Then at step 640, said sample is reconstructed responsive to said formed predictor, for example, by adding prediction residuals to the predicted block.

Figure 7:
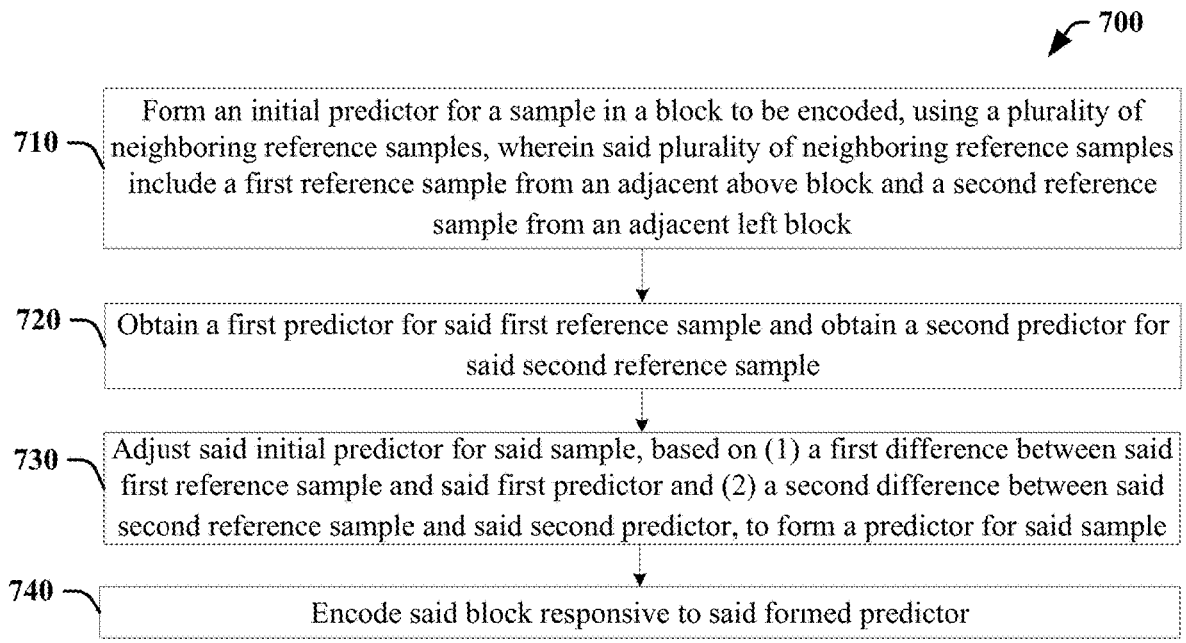
FIG. 7 illustrates a method of video decoding using boundary filtering in intra prediction, according to an embodiment.

FIG. 7 illustrates a method (700) of encoding video data, according to an embodiment. At step 710, an initial predictor for a sample in a block to be encoded is formed, using a plurality of neighboring reference samples, wherein said plurality of neighboring reference samples include a first reference sample from an adjacent above block and a second reference sample from an adjacent left block. At step 720, a first predictor is obtained for said first reference sample and a second predictor is obtained for said second reference sample. At step 730, said initial predictor for said sample is adjusted, based on (1) a first difference between said first reference sample and said first predictor and (2) a second difference between said second reference sample and said second predictor, to form a predictor for said sample. Then at step 740, said block is encoded responsive to said formed predictor, for example, by forming prediction residuals based on the original block and the predictor block, followed by transform, quantization and entropy coding.

Figure 8:
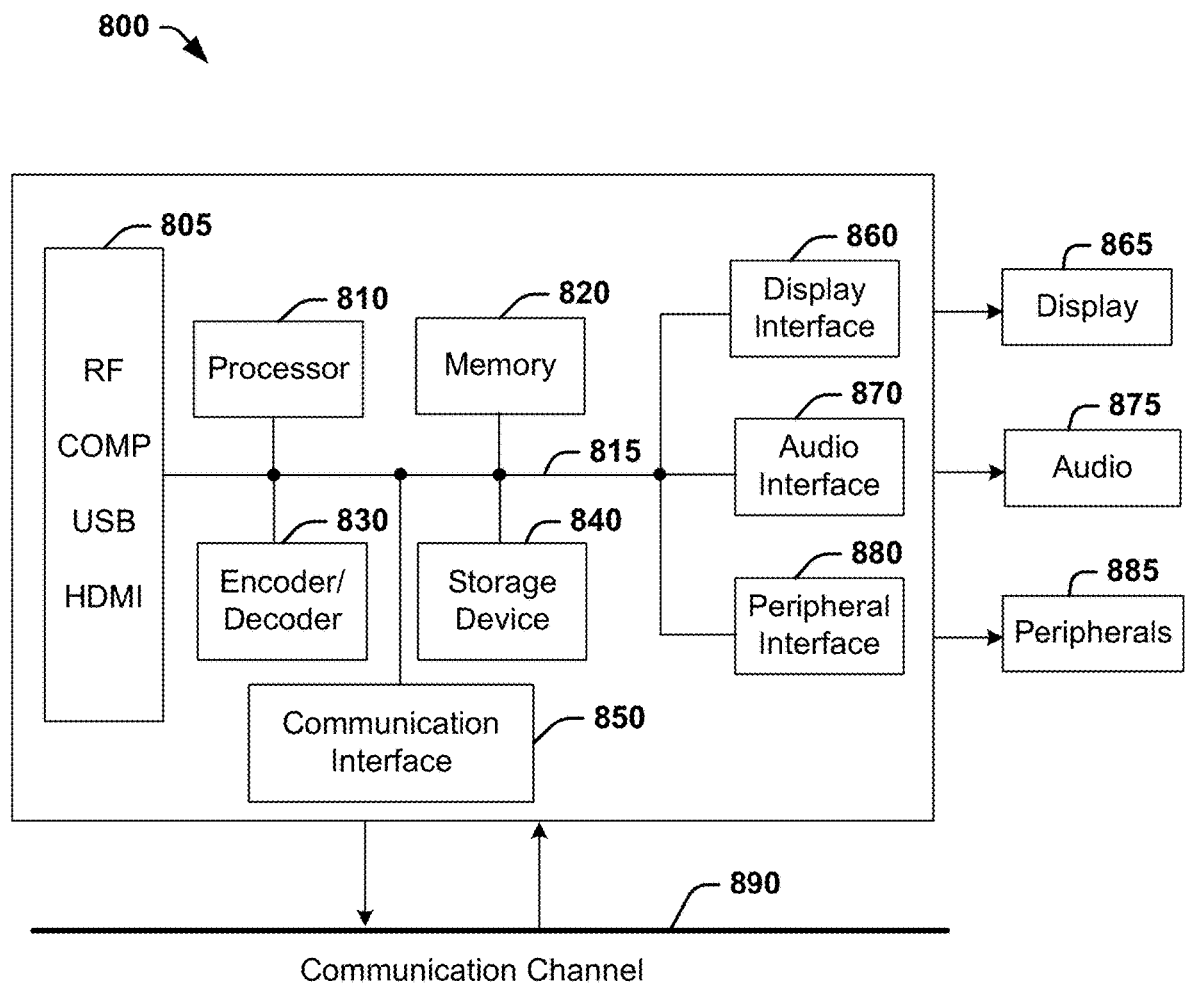
FIG. 8 illustrates a block diagram of a system within which aspects of the present embodiments can be implemented.

FIG. 8 illustrates a block diagram of an example of a system in which various aspects and embodiments are implemented. System 800 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 800, singly or in combination, can be embodied in a single integrated circuit, multiple ICs, and/or discrete components. For example, in at least one embodiment, the processing and encoder/decoder elements of system 800 are distributed across multiple ICs and/or discrete components. In various embodiments, the system 800 is communicatively coupled to other systems, or to other electronic devices, via, for example, a communications bus or through dedicated input and/or output ports. In various embodiments, the system 800 is configured to implement one or more of the aspects described in this document.

The system 800 includes at least one processor 810 configured to execute instructions loaded therein for implementing, for example, the various aspects described in this document. Processor 810 can include embedded memory, input output interface, and various other circuitries as known in the art. The system 800 includes at least one memory 820 (e.g., a volatile memory device, and/or a non-volatile memory device). System 800 includes a storage device 840, which can include non-volatile memory and/or volatile memory, including, but not limited to, EEPROM, ROM, PROM, RAM, DRAM, SRAM, flash, magnetic disk drive, and/or optical disk drive. The storage device 840 can include an internal storage device, an attached storage device, and/or a network accessible storage device, as non-limiting examples.

System 800 includes an encoder/decoder module 830 configured, for example, to process data to provide an encoded video or decoded video, and the encoder/decoder module 830 can include its own processor and memory. The encoder/decoder module 830 represents module(s) that can be included in a device to perform the encoding and/or decoding functions. As is known, a device can include one or both of the encoding and decoding modules. Additionally, encoder/decoder module 830 can be implemented as a separate element of system 800 or can be incorporated within processor 810 as a combination of hardware and software as known to those skilled in the art.

Program code to be loaded onto processor 810 or encoder/decoder 830 to perform the various aspects described in this document can be stored in storage device 840 and subsequently loaded onto memory 820 for execution by processor 810. In accordance with various embodiments, one or more of processor 810, memory 820, storage device 840, and encoder/decoder module 830 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 810 and/or the encoder/decoder module 830 is used to store instructions and to provide working memory for processing that is needed during encoding or decoding. In other embodiments, however, a memory external to the processing device (for example, the processing device can be either the processor 810 or the encoder/decoder module 830) is used for one or more of these functions. The external memory can be the memory 820 and/or the storage device 840, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 800 can be provided through various input devices as indicated in block 805. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 805 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 800 to other electronic devices across USB and/or HDMI connections. It is to be understood that various aspects of input processing, for example, Reed-Solomon error correction, can be implemented, for example, within a separate input processing IC or within processor 810 as necessary. Similarly, aspects of USB or HDMI interface processing can be implemented within separate interface ICs or within processor 810 as necessary. The demodulated, error corrected, and demultiplexed stream is provided to various processing elements, including, for example, processor 810, and encoder/decoder 830 operating in combination with the memory and storage elements to process the datastream as necessary for presentation on an output device.

Various elements of system 800 can be provided within an integrated housing, Within the integrated housing, the various elements can be interconnected and transmit data therebetween using suitable connection arrangement 815, for example, an internal bus as known in the art, including the I2C bus, wiring, and printed circuit boards.

The system 800 includes communication interface 850 that enables communication with other devices via communication channel 890. The communication interface 850 can include, but is not limited to, a transceiver configured to transmit and to receive data over communication channel 890. The communication interface 850 can include, but is not limited to, a modem or network card and the communication channel 890 can be implemented, for example, within a wired and/or a wireless medium.

Data is streamed to the system 800, in various embodiments, using a Wi-Fi network such as IEEE 802.11. The Wi-Fi signal of these embodiments is received over the communications channel 890 and the communications interface 850 which are adapted for Wi-Fi communications. The communications channel 890 of these embodiments is typically connected to an access point or router that provides access to outside networks including the Internet for allowing streaming applications and other over-the-top communications. Other embodiments provide streamed data to the system 800 using a set-top box that delivers the data over the HDMI connection of the input block 805. Still other embodiments provide streamed data to the system 800 using the RF connection of the input block 805.

The system 800 can provide an output signal to various output devices, including a display 865, speakers 875, and other peripheral devices 885. The other peripheral devices 885 include, in various examples of embodiments, one or more of a stand-alone DVR, a disk player, a stereo system, a lighting system, and other devices that provide a function based on the output of the system 800. In various embodiments, control signals are communicated between the system 800 and the display 865, speakers 875, or other peripheral devices 885 using signaling such as AV.Link, CEC, or other communications protocols that enable device-to-device control with or without user intervention. The output devices can be communicatively coupled to system 800 via dedicated connections through respective interfaces 860, 870, and 880. Alternatively, the output devices can be connected to system 800 using the communications channel 890 via the communications interface 850. The display 865 and speakers 875 can be integrated in a single unit with the other components of system 800 in an electronic device, for example, a television. In various embodiments, the display interface 860 includes a display driver, for example, a timing controller (T Con) chip.

The display 865 and speaker 875 can alternatively be separate from one or more of the other components, for example, if the RF portion of input 805 is part of a separate set-top box. In various embodiments in which the display 865 and speakers 875 are external components, the output signal can be provided via dedicated output connections, including, for example, HDMI ports, USB ports, or COMP outputs.

According to an embodiment, a method for video decoding is presented, comprising: forming an initial predictor for a sample in a block to be decoded, using a plurality of neighboring reference samples, wherein said plurality of neighboring reference samples include a first reference sample from an adjacent above block and a second reference sample from an adjacent left block; obtaining a first predictor for said first reference sample and obtaining a second predictor for said second reference sample; adjusting said initial predictor for said sample, based on (1) a first difference between said first reference sample and said first predictor and (2) a second difference between said second reference sample and said second predictor, to form a predictor for said sample; and reconstructing said sample responsive to said formed predictor.

According to another embodiment, a method for video encoding is presented, comprising: forming an initial predictor for a sample in a block to be encoded, using a plurality of neighboring reference samples, wherein said plurality of neighboring reference samples include a first reference sample from an adjacent above block and a second reference sample from an adjacent left block; obtaining a first predictor for said first reference sample and obtaining a second predictor for said second reference sample; adjusting said initial predictor for said sample, based on (1) a first difference between said first reference sample and said first predictor and (2) a second difference between said second reference sample and said second predictor, to form a predictor for said sample; and encoding said block responsive to said formed predictor.

According to another embodiment, an apparatus for video decoding is presented, comprising one or more processors, wherein said one or more processors are configured to: form an initial predictor for a sample in a block to be decoded, using a plurality of neighboring reference samples, wherein said plurality of neighboring reference samples include a first reference sample from an adjacent above block and a second reference sample from an adjacent left block; obtain a first predictor for said first reference sample and obtain a second predictor for said second reference sample; adjust said initial predictor for said sample, based on (1) a first difference between said first reference sample and said first predictor and (2) a second difference between said second reference sample and said second predictor, to form a predictor for said sample; and reconstruct said sample responsive to said formed predictor. The apparatus can further comprise one or more memories.

According to another embodiment, an apparatus for video encoding is presented, comprising one or more processors, wherein said one or more processors are configured to: form an initial predictor for a sample in a block to be encoded, using a plurality of neighboring reference samples, wherein said plurality of neighboring reference samples include a first reference sample from an adjacent above block and a second reference sample from an adjacent left block; obtain a first predictor for said first reference sample and obtaining a second predictor for said second reference sample; adjust said initial predictor for said sample, based on (1) a first difference between said first reference sample and said first predictor and (2) a second difference between said second reference sample and said second predictor, to form a predictor for said sample; and encode said block responsive to said formed predictor. The apparatus can further comprise one or more memories.

According to one embodiment, said first reference sample is adjacent to said block to be decoded or encoded and is at a same horizontal location as said sample, and wherein said second reference sample is adjacent to said block to be decoded and encoded and is at a same vertical position as said sample.

According to one embodiment, said first difference is scaled by a first scaling factor that depends on a vertical position of said sample in said block to be decoded or encoded, and said second difference is scaled by a second scaling factor that depends on a horizontal position of said sample in said block to be decoded or encoded.

According to one embodiment, said first and second scaling factors depend on at least one of a width and a height of said block.

According to one embodiment, said first predictor is obtained using reference samples above said block, and said second predictor is obtained using reference samples to the left of said block.

According to one embodiment, said first predictor is an interpolation of a top-left reference sample and a top-right reference sample, and said second predictor is an interpolation of a top-left reference sample and a bottom-left reference sample.

According to one embodiment, a predictor for a second sample in said block is used as said first predictor and said second sample is adjacent to said first reference sample, and a predictor for a third sample in said block is used as said second predictor and said third sample is adjacent to said second reference sample.

According to one embodiment, whether to adjust said initial predictor for said sample is based on said first difference and said second difference. In one example, a plurality of differences are obtained, each of said plurality of differences corresponding to a reference sample; and said initial predictor for said sample is determined to be adjusted based on an average of said plurality of differences.

According to one embodiment, whether to adjust said initial predictor for said sample is further based on at least one of a bit depth and a block size of said block.

According to one embodiment, said block is decoded or encoded in a DC or planar intra prediction mode.

According to one embodiment, when said block is decoded or encoded in a DC mode, said first predictor corresponds to an average of top reference samples and said second predictor corresponds to an average of left reference samples.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method for video encoding or decoding, comprising:
    forming an initial predictor for a sample in a block, using a plurality of neighboring reference samples, according to a DC or planar intra prediction mode, and wherein said plurality of neighboring reference samples include a first reference sample from an adjacent above block and a second reference sample from an adjacent left block;
    obtaining a first predictor that is used to predict said first reference sample and obtaining a second predictor that is used to predict said second reference sample, wherein said first predictor for said first reference sample is obtained using a first plurality of reference samples, and wherein said second predictor for said second reference sample is obtained using a second plurality of reference samples;
    scaling (1) a first difference between said first reference sample and said first predictor and (2) a second difference between said second reference sample and said second predictor;
    adding said scaled first difference and scaled second difference to said initial predictor to adjust said initial predictor along a vertical direction and a horizontal direction, respectively, forming a predictor for said sample; and
    encoding said block or reconstructing said sample responsive to said formed predictor.

2. The method of claim 1, wherein said first reference sample is adjacent to said block and is at a same horizontal location as said sample, and wherein said second reference sample is adjacent to said block and is at a same vertical position as said sample.

3. The method of claim 1, wherein said first difference is scaled by a first scaling factor that depends on a vertical position of said sample in said block, and wherein said second difference is scaled by a second scaling factor that depends on a horizontal position of said sample in said block.

4. The method of claim 1, wherein said first and second scaling factors depend on at least one of a width and a height of said block.

5. The method of claim 1, wherein said first predictor is obtained only using a plurality of reference samples above said block, and wherein said second predictor is obtained only using a plurality of reference samples to the left of said block.

6. The method of claim 5, wherein said block is encoded or decoded in a planar intra prediction mode, wherein said first predictor is an interpolation of a top-left reference sample and a top-right reference sample, and wherein said second predictor is an interpolation of a top-left reference sample and a bottom-left reference sample.

7. The method of claim 1, wherein a predictor for a second sample in said block is used as said first predictor, said second sample adjacent to said first reference sample, and wherein a predictor for a third sample in said block is used as said second predictor, said third sample adjacent to said second reference sample.

8. The method of claim 1, wherein whether to adjust said initial predictor for said sample is based on said first difference and said second difference.

9. The method of claim 8, further comprising:
    obtaining a plurality of differences, each of said plurality of differences corresponding to a reference sample; and
    determining that said initial predictor for said sample is to be adjusted based on an average of said plurality of differences.

10. The method of claim 1, wherein whether to adjust said initial predictor for said sample is based on at least one of a bit depth and a block size of said block.

11. The method of claim 1, wherein said block is decoded or encoded in a DC mode, and wherein said first predictor corresponds to an average of top reference samples and said second predictor corresponds to an average of left reference samples.

12. An apparatus for video encoding or decoding, comprising:
one or more processors, wherein said one or more processors are configured to:
form an initial predictor for a sample in a block, using a plurality of neighboring reference samples, according to a DC or planar intra prediction mode, wherein said plurality of neighboring reference samples include a first reference sample from an adjacent above block and a second reference sample from an adjacent left block;
obtain a first predictor for said first reference sample and obtain a second predictor for said second reference sample, wherein said first predictor for said first reference sample is obtained using a first plurality of reference samples, and wherein said second predictor for said second reference sample is obtained using a second plurality of reference samples;
scale (1) a first difference between said first reference sample and said first predictor and (2) a second difference between said second reference sample and said second predictor;
add said scaled first difference and scaled second difference to said initial predictor to adjust said initial predictor along a vertical direction and a horizontal direction, respectively, forming a predictor for said sample; and
encode said block or reconstruct said sample responsive to said formed predictor.

13. The apparatus of claim 12, wherein said first difference is scaled by a first scaling factor that depends on a vertical position of said sample in said block, and wherein said second difference is scaled by a second scaling factor that depends on a horizontal position of said sample in said block.

14. The apparatus of claim 12, wherein said first predictor is obtained only using reference samples above said block, and wherein said second predictor is obtained only using reference samples to the left of said block.

15. The apparatus of claim 14, wherein said block is encoded or decoded in a planar intra prediction mode, wherein said first predictor is an interpolation of a top-left reference sample and a top-right reference sample, and wherein said second predictor is an interpolation of a top-left reference sample and a bottom-left reference sample.

16. The apparatus of claim 12, wherein a predictor for a second sample in said block is used as said first predictor, said second sample adjacent to said first reference sample, and wherein a predictor for a third sample in said block is used as said second predictor, said third sample adjacent to said second reference sample.

17. The apparatus of claim 12, wherein whether to adjust said initial predictor for said sample is based on said first difference and said second difference.

18. The apparatus of claim 12, wherein whether to adjust said initial predictor for said sample is based on at least one of a bit depth and a block size of said block.

19. The apparatus of claim 12, wherein said block is decoded or encoded in a DC mode, and wherein said first predictor corresponds to an average of top reference samples and said second predictor corresponds to an average of left reference samples.

* * * * *